(12) United States Patent
Lowery

(10) Patent No.: US 8,099,553 B2
(45) Date of Patent: Jan. 17, 2012

(54) REFACTORING VIRTUAL DATA STORAGE HIERARCHIES

(75) Inventor: James Craig Lowery, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 545 days.

(21) Appl. No.: 12/356,148

(22) Filed: Jan. 20, 2009

(65) Prior Publication Data

US 2010/0185827 A1 Jul. 22, 2010

(51) Int. Cl.
*G06F 13/00* (2006.01)
*G06F 13/28* (2006.01)
*G06F 7/00* (2006.01)
*G06F 17/00* (2006.01)

(52) U.S. Cl. . 711/117; 711/170; 711/165; 711/E12.016; 707/692

(58) Field of Classification Search .................. 711/117, 711/170, 165, E12.016; 707/692
See application file for complete search history.

(56) References Cited

U.S. PATENT DOCUMENTS

| 6,804,682 | B1 | 10/2004 | Kemper et al. | |
| 6,807,548 | B1 | 10/2004 | Kemper | |
| 7,237,236 | B2 | 6/2007 | Kershenbaum et al. | |
| 7,305,419 | B1* | 12/2007 | Cosby et al. | 1/1 |
| 7,370,318 | B1 | 5/2008 | Howe et al. | |
| 2010/0114842 | A1* | 5/2010 | Forman et al. | 707/692 |
| 2010/0121825 | A1* | 5/2010 | Bates et al. | 707/692 |
| 2010/0138827 | A1* | 6/2010 | Frank et al. | 718/1 |

* cited by examiner

*Primary Examiner* — Edward Dudek, Jr.
(74) *Attorney, Agent, or Firm* — Haynes and Boone, LLP

(57) ABSTRACT

A virtual drive data storage refactoring system includes a base drive, a plurality of virtual drives coupled to the base drive and hierachly below the base drive, wherein the virtual drives each include a plurality of data storage blocks and a virtual drive controller system. The virtual drive controller system is operable to coordinate data storage on the base drive and the plurality of virtual drives. The virtual drive controller system is operable to compute a signature for each data storage block, create a list of data content for each data storage block, wherein the list is sorted according to the signature for each data storage block, locate the signatures for each data storage block that appear on each of the virtual drives, arrange the data storage blocks on the virtual drives so that data storage blocks having data content that is the same, are located in corresponding locations on each of the virtual drives, and remove the data storage blocks having data content that is the same from each of the virtual drives to a data storage drive that is hierarchly above the virtual drives.

20 Claims, 4 Drawing Sheets

REFACTORING VIRTUAL DATA STORAGE HIERARCHIES

BACKGROUND

The present disclosure relates generally to information handling systems, and more particularly to a system to refactor virtual data storage hierarchies using an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A virtual disk drive is generally known in the art as a data storage drive, such as a hard disk drive, a floppy drive, a cd/dvd drive, a solid state drive, main memory, network sharing, or others, where the data storage drive is emulated in some fashion by an IHS. It should be understood that a virtual disk drive may be any type of data storage device and does not necessarily require a disk drive. Some virtual data storage formats such as, virtual hard disk drive file formats, provide a feature called "differencing disks" that can be used to save physical storage space and improve the manageability of a similar operating system image across multiple virtual machines. A differencing disk/tree generally allows one to create a data storage drive from a parent drive and all changes from that point will go to the new drive. Thus, the data on the parent drive will not be further modified. As such, the original data may be maintained on the parent drive and the changed data may be saved to the new drive.

FIG. 1 illustrates a block diagram of a prior art differencing drive system in which a base virtual data storage drive is created by installing a common operating system onto it. This drive is then "locked" and becomes the root of a differencing tree (or hierarchy). For each virtual machine that will use this operating system, a second, subordinate differencing virtual drive is created. All writes the virtual machine makes are capture in the differencing drive. Reads for a block of data pull from this drive first, and fall through to the base drive if the virtual machine has never written that block of data. Data storage space savings issues arise from the common, unchanged blocks of data being represented only once on physical storage device, especially when combined with the use of dynamic (sparse) drive representations. Improved manageability is a result of having to perform an installation of the base operating system only once, and then "forking" it as many times as needed for virtual machines that will be based upon it. Note that the differencing hierarchy can be an arbitrary tree as shown in FIG. 2, where each leaf node is assigned to a virtual machine, and all interior nodes are "locked".

A problem with this type of virtual drive system, is that, over time, the differencing drives begin to fill up with blocks of data that have the same content across different virtual machines. Consider, for example, applying an operating system patch to virtual drive system. Ideally, the patch would be applied to the root node, but that node is "locked" and cannot be re-written. Therefore, the same data contents are written to each differencing drive. Furthermore, the common data content will not likely be written to the same block locations on each drive. Other systems block de-duplication using signatures to identify similar blocks of data for consolidation. Thus, differencing disks generally avoid duplication in a "forward" direction, meaning that the single instances of blocks are planned up-front.

Accordingly, it would be desirable to provide improved refactoring for virtual data storage hierarchies absent the disadvantages discussed above.

SUMMARY

According to one embodiment, a virtual drive data storage refactoring system includes a base drive, a plurality of virtual drives coupled to the base drive and hierachly below the base drive, wherein the virtual drives each include a plurality of data storage blocks and a virtual drive controller system. The virtual drive controller system is operable to coordinate data storage on the base drive and the plurality of virtual drives. The virtual drive controller system is also operable to compute a signature for each data storage block, create a list of data content for each data storage block, wherein the list is sorted according to the signature for each data storage block, locate the signatures for each data storage block that appear on each of the virtual drives, arrange the data storage blocks on the virtual drives so that data storage blocks having data content that is the same, are located in corresponding locations on each of the virtual drives, and remove the data storage blocks having data content that is the same from each of the virtual drives to a data storage drive that is hierarchly above the virtual drives.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
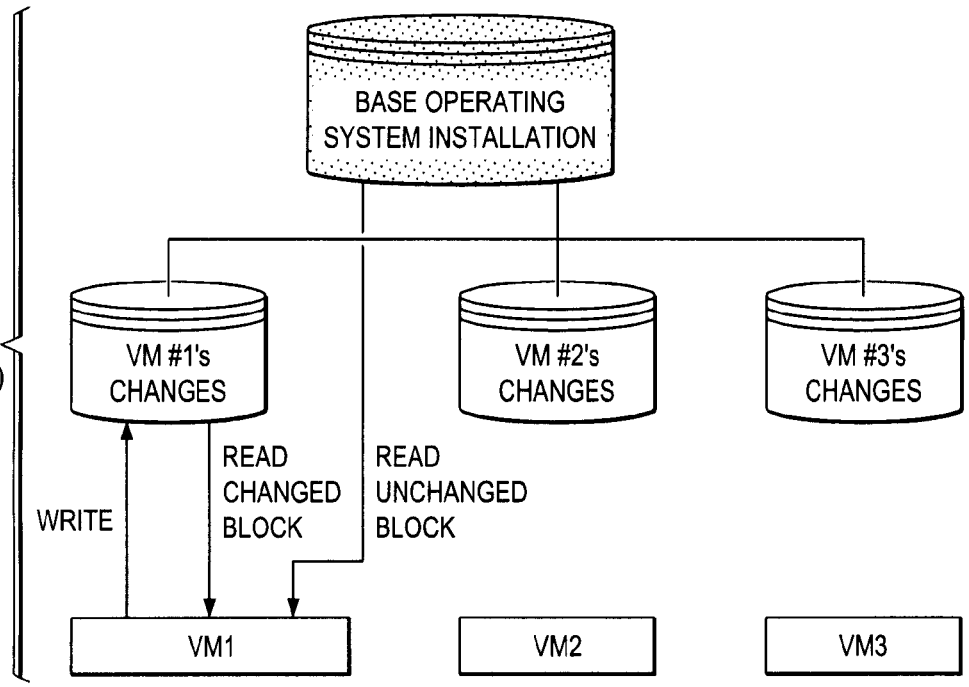
FIG. 1 illustrates a block diagram of a prior art differencing drive system in which a base virtual data storage drive is created by installing a common operating system onto it.
Figure 2:
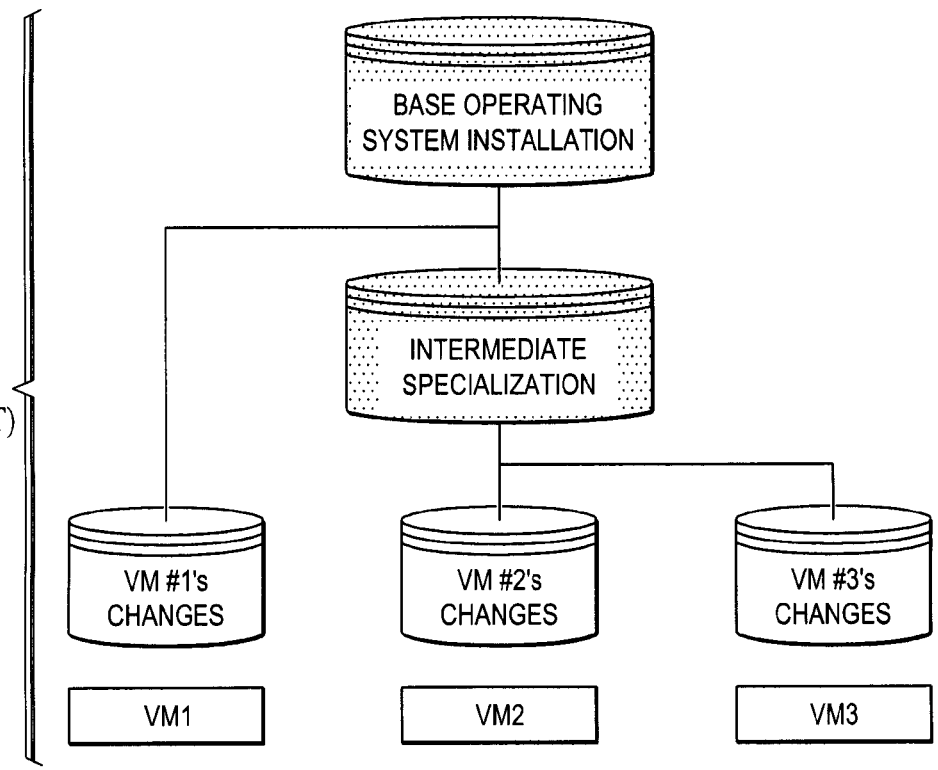
FIG. 2 illustrates a block diagram of a prior art arbitrary differencing drive system where each leaf node is assigned to a virtual machine and all interior nodes are locked.
Figure 3:
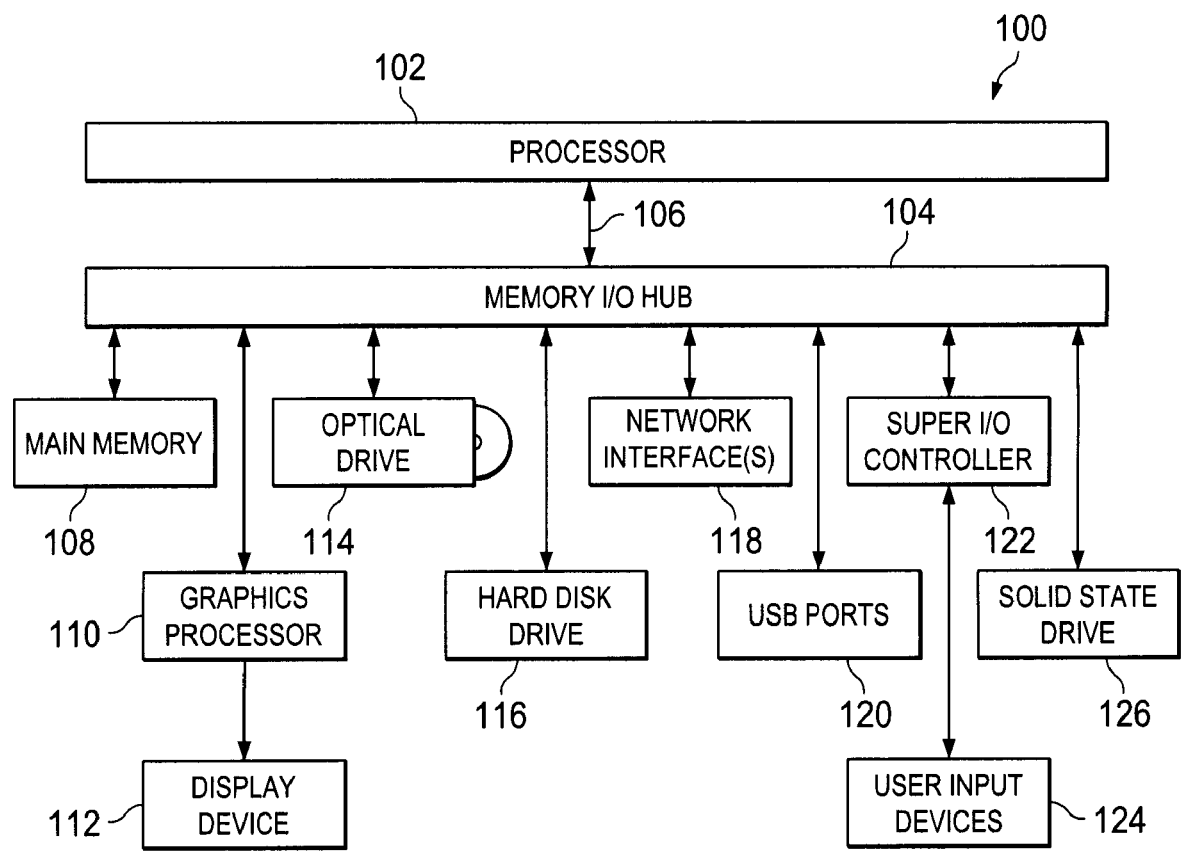
FIG. 3 illustrates an embodiment of an information handling system (IHS).

FIG. 3 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100. It should be understood that the IHS 100 may be coupled with any number of other IHSs and/or any number of data storage drives (e.g., hard disk drive 116, solid state drive 126) via a network, the Internet, or other communication system for virtual drive data storage and operation.

Not all IHSs 100 include each of the components shown in FIG. 3, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Refactoring may be considered to be a process of changing something, such the location of a specific data on an data drive to improve the storage of the data, (e.g., reducing redundancy), while preserving existing functionality of the storage of the data. In an embodiment, the present disclosure discovers and refactors or de-dupes redundant blocks of data in multiple virtual drives after the data is written to more than one virtual drive. In an embodiment, the system may fold the duplicated or redundant data blocks back into the root drive/node.

Figure 4:
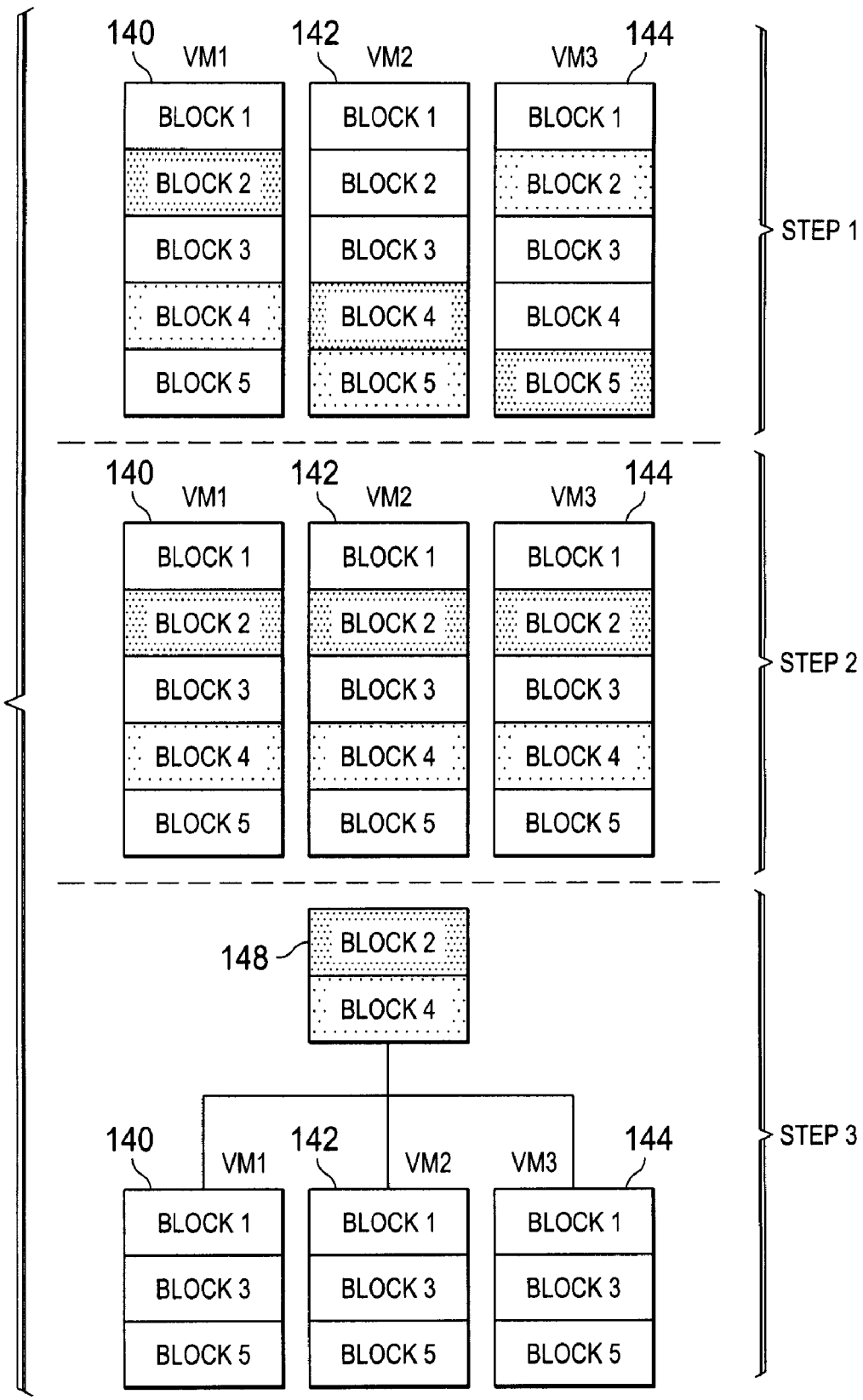
FIG. 4 illustrates an embodiment of a virtual data storage drive system refactoring algorithm.
Figure 5:
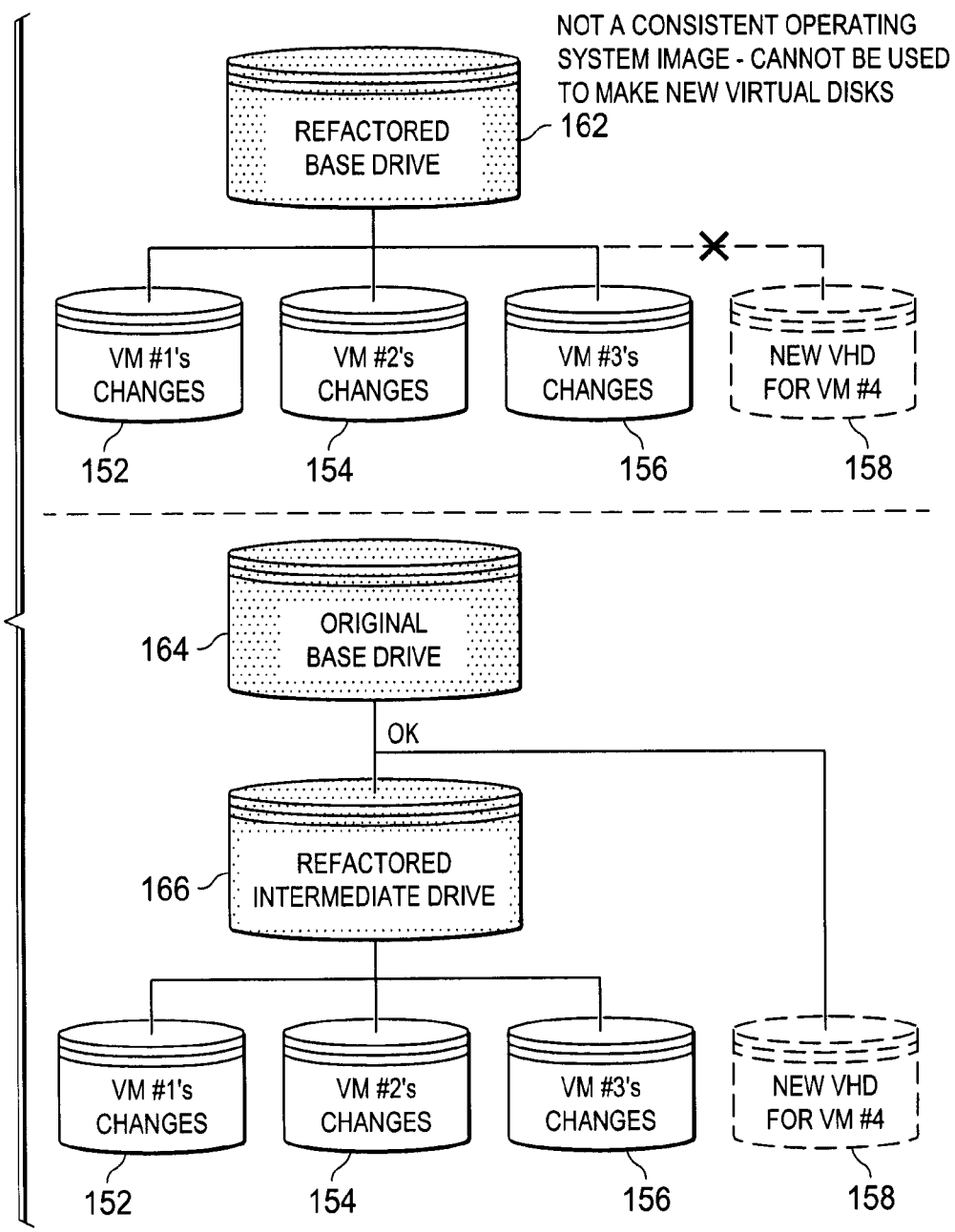
FIG. 5 illustrates an embodiment of a virtual data storage drive system for refactoring the base drive and a virtual data storage drive system for preserving consistency of the base drive using a refactored intermediate drive.

FIG. 4 illustrates an embodiment of a virtual data storage drive system refactoring algorithm. FIG. 5 illustrates an embodiment of a virtual data storage drive system for preserving consistency of the base drive. In FIG. 4, the blocks 1-5 of each virtual machine/virtual drive 140, 142, 144, represent data storage blocks for each of the virtual drives 140, 142, 144. As an example of an embodiment of the present disclosure, assume that the data stored in block 2 of virtual drive 1, 140 is originally duplicated in, or the same as the data stored in block 4 of virtual drive 2, 142 and block 5 of virtual drive 3, 144. Similarly, assume that the data stored in block 4 of virtual drive 1, 140 is originally duplicated in, or the same as the data stored in block 5 of virtual drive 2, 142 and block 2 of virtual drive 3, 144.

Refactoring of a 2-level virtual system tree (root node and multiple children) can be achieved as shown in FIG. 4. For simplicity, each virtual machine's "view" of its virtual drive may be referred to as its "logical virtual disk." The system begins at step 1 by computing a signature for each block 1-5 of each logical virtual disk (e.g., virtual machine 1, 140, virtual machine 2, 142 and virtual machine 3, 144) and create a list for each disk sorted by that signature. In an embodiment, the signature may be computed by using a cyclic redundancy check (CRC), or other type of system for computing a signature of the data. CRC is generally meant to input a data stream of any length and output a value relating to the data stream. Next, at step 2, the system uses a sort/merge algorithm to find signatures that appear on each logical virtual disk (e.g., virtual machine 1, 140, virtual machine 2, 142 and virtual machine 3, 144). These data blocks are candidate blocks for a new root virtual disk. In an embodiment, the system may validate that the contents of the data blocks are indeed the same as the content blocks of other virtual drives. In an embodiment, sorting may be performed using systems in utilities, such as a defragmenter, to move the data blocks in each drive so that they are in corresponding positions on the different virtual drives. In an embodiment, the system may make a note/set a bit in memory 108 indicating that these data blocks should not be moved again. The system may also create a new root disk file 148, at step 3, that contains the common blocks (e.g., block 2 and block 4), and create new differencing disks for each virtual machine 140, 142, 144. It is to be understood that any number of virtual levels may be used with the systems and methods of the present disclosure.

FIG. 5 illustrates an embodiment of a virtual data storage drive system for refactoring the base drive 162 and a virtual data storage drive system for preserving consistency of the base drive 164 using a refactored intermediate drive 166. As should be readily understood by a person having ordinary skill in the art, s the changes in data content on the virtual drives (140, 142 and 144 of FIG. 4) are shown as the virtual drive data content change registers 152, 154 and 156. As such, any changes to the data on the virtual drives 140, 142 and/or 146 may be respectively stored on the change registers 152, 154 and/or 156. Refactoring causes the data content on the refactored base drive 162 to be modified with refactoring. Therefore, if the original base drive 164 is to remain constant for creating new virtual drives, such as the drive 158, an intermediate drive 166 may be used for refactoring.

If consistent data is desired for the base drive 162, an embodiment, as shown in FIG. 5, is to create a new intermediate node 166 containing the new data blocks for storing the in-common data. This system computes a signature for each block 1-5 of each logical virtual disk (e.g., virtual machine 1, 140, virtual machine 2, 142 and virtual machine 3, 144) and create a list for each disk sorted by that signature. In an embodiment, the signature may be computed by using a cyclic redundancy check (CRC), or other type of system for computing a signature of the data. CRC is generally meant to input a data stream of any length and output a value relating to the data stream. If the data block is already in the base drive 164, the system may ignore it. In other words, only data blocks in common across all virtual drives and not in the base node are collected.

The system then uses a sort/merge algorithm to find signatures that appear on each logical virtual disk (e.g., virtual machine 1, 140, virtual machine 2, 142 and virtual machine 3, 144). These data blocks are candidate blocks for a new root virtual disk. In an embodiment, the system may validate that the contents of the data blocks are indeed the same as the content blocks of other virtual drives. In an embodiment, sorting may be performed using systems in utilities, such as a defragmenter, to move the data blocks in each drive so that they are in corresponding positions on the different virtual drives. In an embodiment, the system may make a note/set a bit in memory 108 indicating that these data blocks should not be moved again. In this embodiment, blocks can only be relocated to positions that are "hidden" (overlaid) in the base image. The system may also create a new root disk file 148, at step 3, that contains the common blocks (e.g., block 2 and block 4 of FIG. 4), and create an intermediate node that contains the common blocks and subordinate it to the original root disk, and create new differencing disks for each virtual drive. It is to be understood that any number of virtual levels may be used with the systems and methods of the present disclosure.

A further refinement of the algorithm of the present disclosure may take into account that sometimes a data block will be common across a proper subset of the virtual drives 152, 154, 156 (e.g., some of them, but not all of them). In this case, an arbitrary tree may be created. An algorithm for accomplishing this may be parameterized to balance complexity of the tree with the potential space savings and performance impacts of multiple redirects in the hierarchy. One such parameter could be the number of similar blocks required to trigger creating of the intermediate node.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual drive data storage refactoring system comprising:
   a base drive;
   a plurality of virtual drives coupled to the base drive and hierachly below the base drive, wherein the virtual drives each include a plurality of data storage blocks; and
   a virtual drive controller system operable to coordinate data storage on the base drive and the plurality of virtual drives, wherein the virtual drive controller system is operable to:
   compute a signature for each data storage block;
   create a list of data content for each data storage block, wherein the list is sorted according to the signature for each data storage block;
   locate the signatures for each data storage block that appear on each of the virtual drives;
   arrange the data storage blocks on the virtual drives so that data storage blocks having data content that is the same, are located in corresponding locations on each of the virtual drives; and
   remove the data storage blocks having data content that is the same from each of the virtual drives to a data storage drive that is hierarchly above the virtual drives.

2. The virtual drive data storage refactoring system of claim 1, wherein the signature is computed using a cyclic redundancy check.

3. The virtual drive data storage refactoring system of claim 1, wherein the base drive includes an operating system.

4. The virtual drive data storage refactoring system of claim 1, wherein the virtual drive controller system is operable to validate that data in the list of data content for each data storage block is the same on each of the virtual drives.

5. The virtual drive data storage refactoring system of claim 1, wherein a defragmenting system is used to arrange the data storage blocks on the virtual drives so that data storage blocks having data content that is the same are located in corresponding locations on each of the virtual drives.

6. The virtual drive data storage refactoring system of claim 1, wherein the virtual drive controller system is operable to set a bit so that the data storage blocks may not be moved after refactoring.

7. The virtual drive data storage refactoring system of claim 1, wherein the virtual drive controller system is operable to create a new differencing disk for each virtual drive.

8. An information handling system (IHS) comprising:
   a processor;
   memory coupled to the processor; and
   a virtual drive data storage refactoring system operable by the processor, the virtual drive data storage refactoring system comprising:
   a base drive;
   a plurality of virtual drives coupled to the base drive and hierachly below the base drive, wherein the virtual drives each include a plurality of data storage blocks; and
   a virtual drive controller system operable to coordinate data storage on the base drive and the plurality of virtual drives, wherein the virtual drive controller system is operable to:
   compute a signature for each data storage block;
   create a list of data content for each data storage block, wherein the list is sorted according to the signature for each data storage block;
   locate the signatures for each data storage block that appear on each of the virtual drives;
   arrange the data storage blocks on the virtual drives so that data storage blocks having data content that is the same, are located in corresponding locations on each of the virtual drives; and
   remove the data storage blocks having data content that is the same from each of the virtual drives to a data storage drive that is hierarchly above the virtual drives.

9. The IHS of claim 8, wherein the signature is computed using a cyclic redundancy check.

10. The IHS of claim 8, wherein the base drive includes an operating system.

11. The IHS of claim 8, wherein the virtual drive controller system is operable to validate that data in the list of data content for each data storage block is the same on each of the virtual drives.

12. The IHS of claim 8, wherein a defragmenting system is used to arrange the data storage blocks on the virtual drives so that data storage blocks having data content that is the same are located in corresponding locations on each of the virtual drives.

13. The IHS of claim 8, wherein the virtual drive controller system is operable to set a bit so that the data storage blocks may not be moved after refactoring.

14. The IHS of claim 8, wherein the virtual drive controller system is operable to create a new differencing disk for each virtual drive.

15. A method to refactor a virtual drive data storage system, the method comprising:
- coordinating data storage on a base drive and a plurality of virtual drives using a virtual drive controller system, wherein the virtual drives each include a plurality of data storage blocks;
- computing a signature for each data storage block;
- creating a list of data content for each data storage block, wherein the list is sorted according to the signature for each data storage block;
- locating the signatures for each data storage block that appear on each of the virtual drives;
- arranging the data storage blocks on the virtual drives so that data storage blocks having data content that is the same, are located in corresponding locations on each of the virtual drives; and
- removing the data storage blocks having data content that is the same from each of the virtual drives to a data storage drive that is hierarchly above the virtual drives.

16. The method of claim 15, wherein the signature is computed using a cyclic redundancy check.

17. The method of claim 15, wherein the base drive includes an operating system.

18. The method of claim 15, wherein the virtual drive controller system is operable to validate that data in the list of data content for each data storage block is the same on each of the virtual drives.

19. The method of claim 15, wherein a defragmenting system is used to arrange the data storage blocks on the virtual drives so that data storage blocks having data content that is the same are located in corresponding locations on each of the virtual drives.

20. The method of claim 15, wherein the virtual drive controller system is operable to set a bit so that the data storage blocks may not be moved after refactoring.

* * * * *